United States Patent [19]

Sues et al.

[11] Patent Number: 4,980,911
[45] Date of Patent: * Dec. 25, 1990

[54] TRANSIENT SIGNAL ELIMINATION CIRCUIT FOR TELECOMMUNICATIONS APPLICATIONS WITH CPU CONTROL MEANS

[75] Inventors: John M. Sues, New York; Jing H. Sun, Roosevelt Island, both of N.Y.

[73] Assignee: The Inteleplex Corporation, Paramus, N.J.

[ * ] Notice: The portion of the term of this patent subsequent to Oct. 3, 2006 has been disclaimed.

[21] Appl. No.: 378,419

[22] Filed: Jul. 11, 1989

Related U.S. Application Data

[63] Continuation-in-part of Ser. No. 231,494, Aug. 12, 1988, Pat. No. 4,872,198.

[51] Int. Cl.$^5$ ............................................. H04M 11/06
[52] U.S. Cl. .................................... 379/377; 379/106; 379/39; 370/110.1
[58] Field of Search ...................... 379/90, 93, 94, 106, 379/107, 109, 351, 353, 377, 386, 399, 412, 414, 416, 40, 39; 370/110.1

[56] References Cited

U.S. PATENT DOCUMENTS

| | | | |
|---|---|---|---|
| 4,086,234 | 4/1978 | Bocchi | 379/107 |
| 4,493,948 | 1/1985 | Sues et al. | 379/42 |
| 4,528,422 | 7/1985 | Cupani | 379/42 X |
| 4,665,516 | 5/1987 | Middleton et al. | 379/107 X |
| 4,872,198 | 8/1988 | Sues et al. | 379/377 |

*Primary Examiner*—James L. Dwyer
*Attorney, Agent, or Firm*—Lieberman Rudolph & Nowak

[57] ABSTRACT

Transient signal elimination circuitry is disposed in a local communications loop extending from a subscriber telephone to a telephone central office couples ringing and on-hook and off-hook signals through the loop after removing transients in these signals. The circuitry also isolates the telephone subscriber and central office from the local loop until an off-hook signal is detected and restores this isolation when an on-hook condition exists at the telephone subscriber. Transient signal elimination is accomplished with a CPU driven interface which detects undesirable transients such as a ringing or off-hook signal, and in response thereto generates a burst of double tone signal to alert connected equipment. In this manner, the local loop can be simultaneously used for both voice communications and a second information signal with each signal capable of occupying the same bandwidth. These signals can operate independently of each other.

10 Claims, 4 Drawing Sheets

TRANSIENT SIGNAL ELIMINATION CIRCUIT FOR TELECOMMUNICATIONS APPLICATIONS WITH CPU CONTROL MEANS

RELATED APPLICATIONS

This is a continuation-in-part application of U.S. patent application, Ser. No. 231,494, now U.S. Pat. No. 4,872,198 entitled "Transient Signal Elimination Circuit for Telecommunications Applications", filed Aug. 12, 1988, and assigned to the present assignee of the instant application.

TECHNICAL FIELD

The present invention relates to the field of information transfer and, more particularly to, a transient signal elimination circuit which, under CPU control, removes spurious transient signals from a telephone local loop in a manner which allows the simultaneous use of that loop for both normal voice communications and a second information signal.

BACKGROUND OF THE INVENTION

The number of worldwide telephone subscribers is substantial and is rapidly increasing. Each such subscriber is generally connected to a telephone central office via a metallic pair of wires referred to as the telephone "local loop." This huge network of communications paths is grossly under utilized as it is normally used only for sporadic voice communications between telephone subscribers via one or more telephone central offices. In addition, there is a burgeoning demand for data access to telephone subscribers in order to provide such services as interactive television viewing, at-home shopping and banking services, monitoring alarm conditions in the home or office, and a host of other applications in which it is necessary to transmit data to, and receive data from, the telephone subscriber. The known under utilization of the telephone local loop network, and the growing demand for access to the telephone subscriber, has sparked a search for means to utilize the telephone local loop for information transfer, while leaving the underlying voice communications undisturbed.

Systems now exist which permit the simultaneous transmission of both voice and a secondary information signal over the local loop. One such system is described in U.S. Pat. Nos. 4,493,948 and 4,528,422, assigned to The Inteleplex Corporation, the present assignee of the instant invention. Such systems generally comprise an information terminal coupled to the ring and tip conductors of the local loop at a first location, such as the location of the telephone subscriber, and a companion information terminal also coupled to the ring and tip conductors at a second location, such as the telephone central office. The information terminals are designed to transmit complementary signals, in both amplitude and phase, on the ring and tip conductors between a respective conductor and earth ground. These signals are carefully balanced longitudinally between the tip and ring conductors and, when precisely balanced, the signals will not disturb the normal underlying voice communications. It is, of course, understood that voice communications is not disturbed because the telephone equipment works on the principal of detecting a difference in voltage and/or phase between the signals on the tip and ring conductors. As a result, perfectly balanced signals are essentially invisible to the telephone equipment.

Systems like those described in the above-referenced two U.S. patents provide excellent service in permitting a secondary information signal to be superimposed over normal voice communications carried on the local loop. However, in order for such systems to operate properly, perfect signal balance must be maintained between the tip and ring conductors at all times.

A problem arises in maintaining balanced signals when transmitting over metallic tip and ring conductors of the local loop. Factors such as differences in tip and ring conductor lengths, differences in manufacturing tolerances, and various environmental conditions can change the impedance of either of the conductors. Any change in impedance, even a very small one, results in unbalanced longitudinal signals, i.e., differences exist between amplitude and phase of such signals. Such differences, in turn, result in unwanted interference (cross-talk) with voice communications being carried over the local loop.

Previous solutions to this problem have included the use of manually adjustable potentiometers within the local loop that require periodic adjustment by a technician. However, the maintenance expenses alone associated with a circuit requiring such manual adjustment would render it impractical to use this technique widely, such as in conjunction with the existing telephone network.

Most recently, in a pending application entitled "Automatic Balancing Circuit for Longitudinal Transmission System", apparatus is disclosed which automatically provides phase and amplitude balancing of two signals coupled on the local loop. One signal is carried between a ring conductor and ground while the second is carried between a tip conductor and ground. While this technique allows two signals to be simultaneously coupled on the local loop at the same time, transient signals occur on the loop which interfere with such simultaneous transmission despite the fact that the two signals are balanced. One such transient occurs during the on-hook to off-hook signal supplied by a subscriber telephone to a central office while the other appears at varying times during the duration of the ringing signal coupled from the central office to the subscriber telephone. It would, therefore, be extremely desirable to eliminate the information loss due to the existence of such transients in a manner which is compatible with the operation of the existing voice communications network and which permits simultaneous use of the local loop for voice communications and another information signal.

SUMMARY OF THE INVENTION

Broadly speaking, the present invention eliminates undesirable transient signals in a local loop which interfere with the simultaneous use of the loop for the transmission of two balanced signals representing different information. In addition, the signals in which the transients appear are coupled through the elimination circuitry to the local loop. The invention also provides isolation of a subscriber telephone from the local loop until after an off-hook condition is detected at a subscriber telephone. This isolation is restored when an on-hook condition is detected at the subscriber telephone. A first feature of this technique is that it is transparent to normal voice communications and is compatible with circuitry which allows a second information signal to be superimposed on a voice signal so that a local communications loop can be simultaneously used for both voice and the second information signal. A second feature of this technique is the use of a CPU driven interface which detects undesirable transients, such as a ringing signal and, in response thereto, generates a burst of double tone signal to alert the connected equipment that ringing has occurred. The use of this double tone signal completely eliminates all undesirable transient signals.

DETAILED DESCRIPTION

Figure 1:
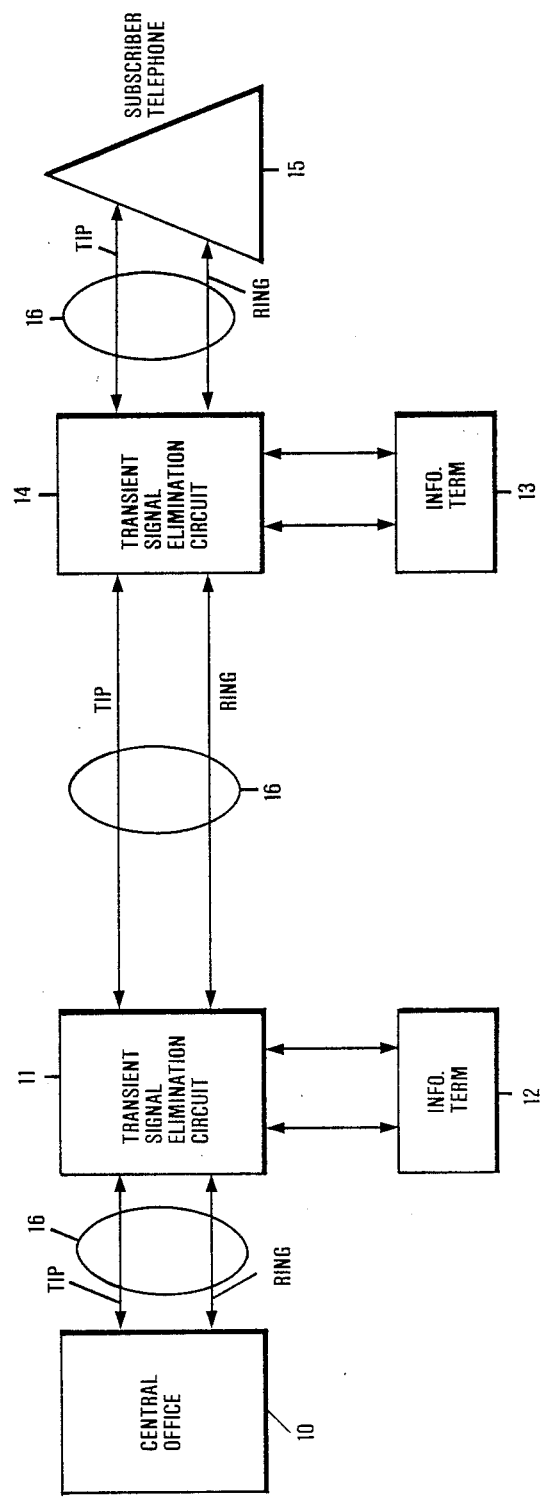
FIG. 1 is a block diagram representation of the manner in which the present invention is utilized in conjunction with an existing telephone network.

FIG. 1 shows an illustrative application of the present invention wherein a secondary information transfer system is connected to a conventional local loop of the telephone system to transfer a second information signal without disturbing simultaneous normal voice communications. It should, of course, be understood that the information carried by this second information signal can take many forms, such as voice, data, facsimile, etc. and this signal can occupy the entire voice bandwidth which extends from approximately 300 to 3400 Hz. The transfer system includes transient signal elimination circuits 11 and 14 and information terminals 12 and 13. (Each of circuits 11 and 14 advantageously incorporates an automatic balancing circuit which is the subject of a copending application entitled "Automatic Balancing Circuit For Longitudinal Transmission System," Ser. No. 228,017, filed Aug. 2, 1988, and assigned to the present assignee of the instant invention, along with the circuitry disclosed in U.S. Pat. Nos. 4,493,948 and 4,528,422. This application and the cited patents are hereby incorporated by reference herein.

As illustrated, transient signal elimination circuits 11 and 14 are connected in series with loop 16 which extends from telephone central office 10 to subscriber telephone set 15. Loop 16 is a conventional 2-wire conductor having a tip and a ring lead and may be of any length and impedance such as is permissible in a conventional telephone network. Information terminals 12 and 13 are also connected to loop 16 between circuits 11 and 14 via interface circuitry advantageously incorporated within transient elimination circuits 11 and 14. Of course, it should be understood that appropriate equipment could be provided at the telephone central office to transmit information received from information terminal 12 to any desired location and to forward information to terminal 12.

As will be described hereinbelow, circuits 11 and 14 permit the use of loop 16 for information transfer between terminals 12 and 13 at the same time that voice communication is occurring between central office 10 and subscriber telephone 15. The automatic balancing circuits within transient signal elimination circuits 11 and 14 provide phase and amplitude balancing of the voice and data signals on loop 16. When such balancing is provided, there is no phase or amplitude difference between the data and voice signals conducted by loop 16.

Even when phase and amplitude balancing are provided, such as is described in the above-cited copending patent application, Ser. No. 228,017, transient signals exist in the telephone network. One such transient signal is the ringing signal provided from the telephone central office and the other is the on-hook to off-hook signal from a subscriber telephone. Both the ringing and subscriber telephone signals include a spike or surge which causes information loss even when the second information and normal voice signals are balanced. Furthermore, the surge in the ringing signal can occur at any time during the ringing signal. The existence of these interfering spikes or surges are not troublesome for normal voice communications as one is not talking during the period the ringing and on-hook to off-hook signals are present but they can cause information loss if information transfer and voice communications simultaneously occur in the same bandwidth. The function of transient signal elimination circuits 11 and 14 is to eliminate the troublesome transients present in the ringing and on-hook to off-hook signals while not interfering with the function of these signals for normal voice communications.

Figure 2:
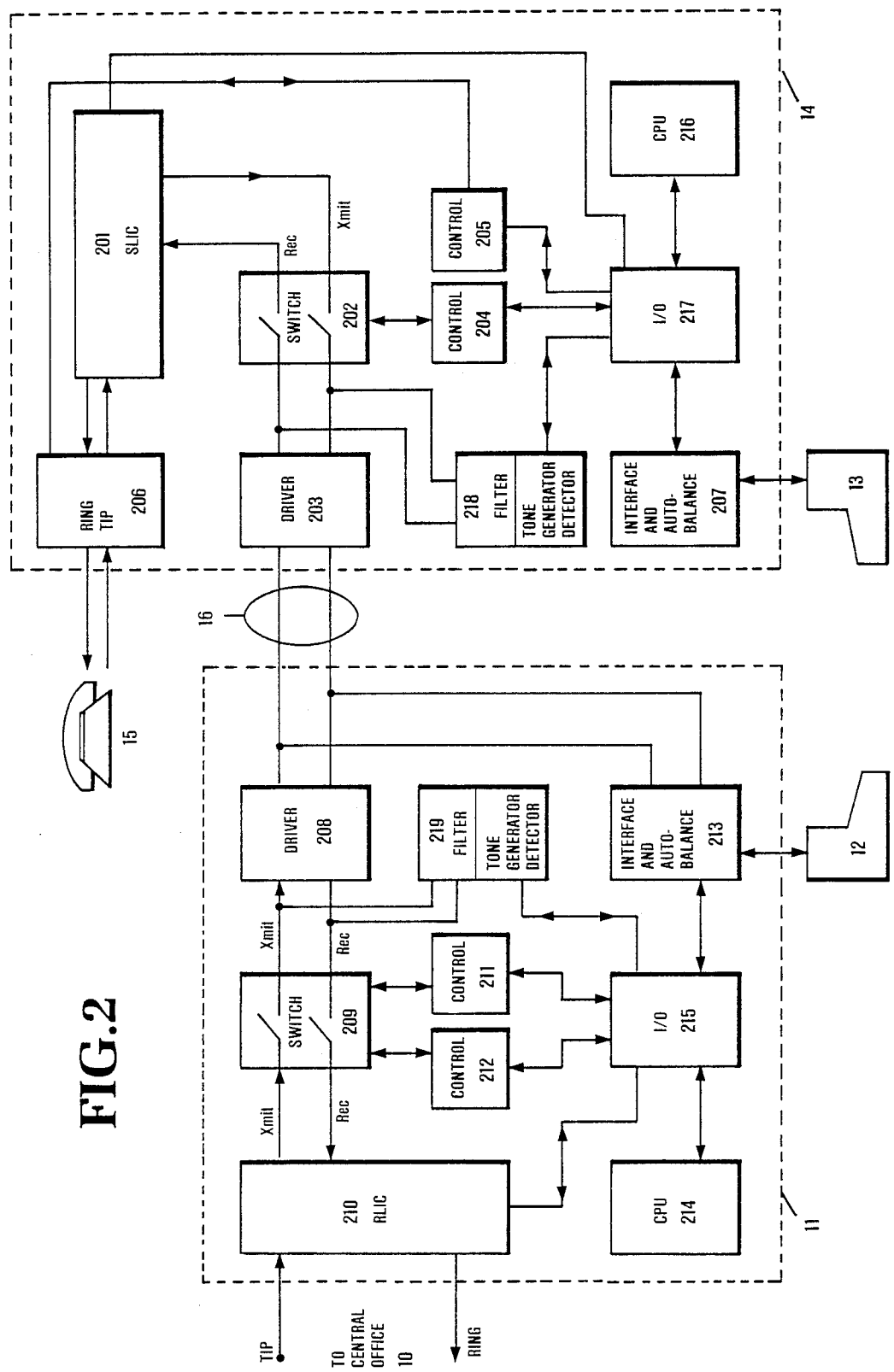
FIG. 2 is a block diagram representation of the present invention which depicts the various circuit elements of the CPU driven transient signal elimination circuits 11 and 14 of FIG. 1.

Refer now to FIG. 2. The tip and ring conductors from subscriber telephone 15 are serially connected to transient signal elimination circuit 14. Circuit 14 includes subscriber line interface circuit (SLIC) 201, switch 202, driver 203, control units 204 and 205, ring trip generator 206, interface and auto balance circuit 207, CPU 216, Input/Output interface circuit 217, and filter/tone generator detector 218. SLIC 201 is a well-known two to four wire telephone interface which provides the functions necessary to supervise signalling and audio transmission between a switching system and a subscriber loop. Commercially available components, such as the AMS 2002 or 2006 manufactured by Aptek Microsystems may be used for SLIC 201. While other commercially available components might be used, for purposes of clarity, in the description to follow, reference to the terminal designations of the Aptek Microsystems components will be used.

Driver 203 is connected to loop 16 extending between transient signal elimination circuits 11 and 14 and provides transmit (Xmit) and receive (Rec) signal conductors in a well-known fashion. These conductors are coupled through different poles of switch 202 and thence to the transmit (Xmit) and receive (Rec) terminals of SLIC 201. The tip and ring terminals of SLIC 201 are respectively connected to the tip and ring conductors of loop 16 extending from subscriber telephone 15 to transient signal elimination circuit 14. Control unit 204 is connected to switch 202 and to I/O circuit 217, while control unit 205 is connected to I/O circuit 217 and ring trip generator 206. CPU 216 is connected to I/O circuit 217, which is in turn coupled to interface and auto balance circuit 207, filter and tone generator detector 218 and control units 204 and 205. Filter and tone generator detector 218 is also connected to switch 202 and driver 203. Information terminal 13 is connected to loop 16 extending between transient elimination circuits 11 and 14 after first passing through interface 207. This interface, which allows a second information signal to be superimposed over voice communications, includes an automatic balancing circuit advantageously of the type described in the above-referenced copending patent application, Ser. No. 228,017, along with the circuitry disclosed in U.S. Pat. Nos. 4,493,948 and 4,528,422.

The tip and ring conductors from central office 10 are coupled to transient signal elimination circuit 11. Circuit 11 includes driver 208, switch 209, reverse line interface circuit (RLIC) 210, control units 211 and 212 and interface and autobalance circuit 213. RLIC 210 is a well-known device that terminates a telephone line from a telephone central office for the purpose of connecting auxiliary equipment that adds features or changes transmission methods. Commercially available components such as the AMS2039, 2040, 2041 or 2042 manufactured by Aptek Microsystems are suitable. While other similar devices may be used, for the purpose of consistency with the foregoing description, the terminal designations of the Aptek Microsystems devices will be used.

Driver 208 is connected to loop 16 and provides transmit (Xmit) and receive (Rec) conductors which are coupled to the poles of switch 209 and then to the transmit (Xmit) and receive (Rec) terminals of RLIC 210, respectively. The tip and ring conductors of loop 16 extending from central office 10 to transient signal elimination circuit 11 are respectively connected to the tip and ring terminals of RLIC 210. Control unit 212 is connected to switch 209 and I/O circuit 215, and control unit 211 is connected between I/O circuit 215 and switch 209. CPU 214 is connected to I/O circuit 215, which in turn is connected to control units 211 and 121, interface and auto balance circuit 213, as well as filter and tone generator detector 219. Filter and tone generator detector 219 is also connected to switch 209 and driver 208. Information terminal 12 is connected to loop 16 between transient signal elimination circuits 11 and 14 after passing through interface 213 which is identical in function and structure to interface 207.

Referring to transient signal elimination circuit 11, the ringing signal from RLIC 210 is applied to the I/O interface circuit 215, which in turn relays this information to CPU 14. The CPU, in response thereto, activates dual tone generator 219, which generates a burst of dual frequency tone which is transmitted to transient elimination circuit 14 via driver 208. Accordingly, the above process converts ringing signal from the central office into a dual frequency tone burst to eliminate all transient noises associated with the ringing signal from the central office. RLIC 210 is the device that actually absorbs the ringing signal along with transient noise.

The dual frequency tone signal transmitted from the central office to transient signal elimination circuit 14 (to indicate a ringing condition) is received by circuit 14 by driver 203 and applied to filter and tone generator detector 218. This signal is filtered and then detected by the tone generator detector 218, which provides a digital output, a logic 1 signal when correct tone is detected, and a logic 0 signal when incorrect tone is detected.

The output of filter tone generator detector 218 is applied to CPU 216 via I/O interface circuit 217. The CPU responds to the detection of correct tone by transmitting a command signal to control unit 205, via I/O interface circuit 217 which in turn activates local ringer 206 to ring the subscriber telephone 215.

On-hook/off-hook conditions are monitored by SLIC 201 and ring trip generator 206, as generator 206 is capable of detecting on-hook/off-hook changes of state when the phone is ringing and to transmit notice of the state changes to SLIC 201. The output of device 201 indicates the change of state when the hand set goes off-hook from an on-hook position, or goes on-hook from an off-hook position. This state change is communicated to CPU 216 via I/O interface 217. In response thereto, CPU 216 instructs control unit 204 to activate switch 202. Also, CPU 216 transmits a command signal to dual frequency tone generator 218 and in response thereto transmits a burst of dual frequency tone through driver 203 and to the central office 10 via transmit signal elimination circuit 11.

When circuit 11 receives this tone, it is detected by filter and tone generator detector 219, which in turn informs CPU 214 via I/O interface 215. CPU 214 issues a corresponding command to control unit 211 and RLIC 210. The CPU instructs control unit 211 to actuate switch 209 and RLIC 210 is instructed to provide proper impedance levels to the central office.

The foregoing process thus eliminates any unwanted transient noise associated with changes in the telephone hook switch position.

It should be noted that transient signal elimination circuits 11 and 14 serve to isolate the subscriber telephone and central office from the portion of loop 16 between these signal elimination circuits so as to preclude transient signals, occurring when telephone 15 goes off-hook, from interfering with simultaneous information transfer occurring between terminals 12 and 13. In addition, elimination circuits 11 and 14 provide signalling to central office 10 that an on-hook or off-hook condition exists. Advantageously, this action has occurred in a way which is transparent, i.e., unnoticeable, to the information transfer between terminals 12 and 13. Moreover, the on-hook and off-hook conditions of the subscriber telephone are supplied to the central office using signals identical, but for the elimination of the transient signals, to those present in present voice communications. Finally, it will be noted that the information transfer between terminals 12 and 13 can occur simultaneously with the voice communications between subscriber telephone 15 and central office 10 and this information transfer can also take place independently of any voice communication between the subscriber telephone and central office.

Figure 3:
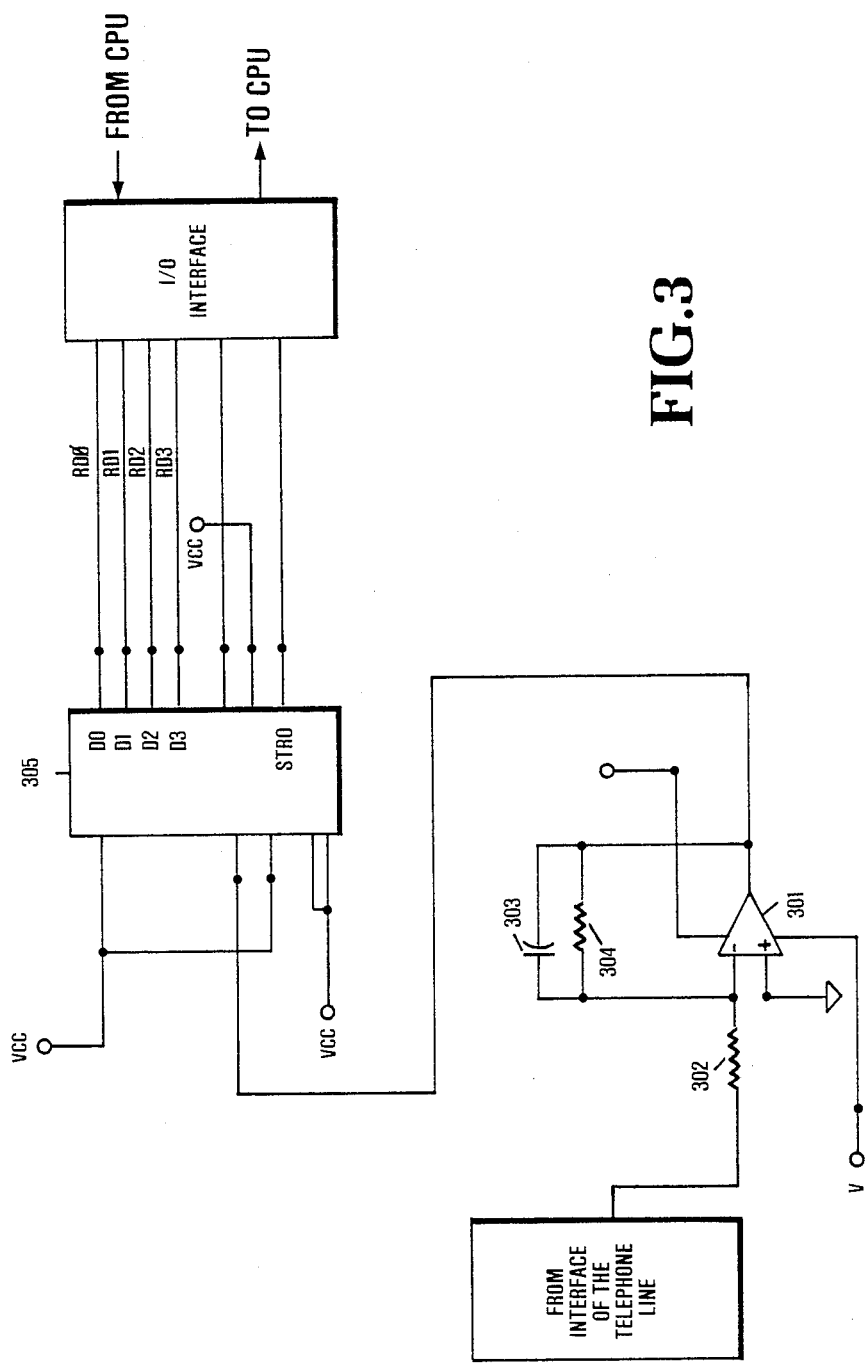
FIG. 3 is a block diagram representation of control unit 204 in FIG. 2.

Referring now to FIG. 3, there is shown the circuit for tone detection which is part of circuits 218 and 219 in FIG. 2, it being understood that the tone detection circuit is identical for both circuits 218 and 219. Amplifier 301 is a simple amplifier used to amplify the signal received from the telephone line via driver 208 as described above. Components 302–304 are biasing components for amplifier 301 which function in a well-known manner and will not be further described herein.

Integrated circuit 305 is the device which performs the actual task of tone detecting and is manufactured by Teltone Corporation. The outputs of this device are D0–D3 and the STROBE output. The STROBE output is used to indicate to the CPU via the I/O interface circuit that a tone has been detected. The logical state of outputs D0–D3 are used to tell the CPU when a particular tone among 16 possible different tones has been detected.

Figure 4:
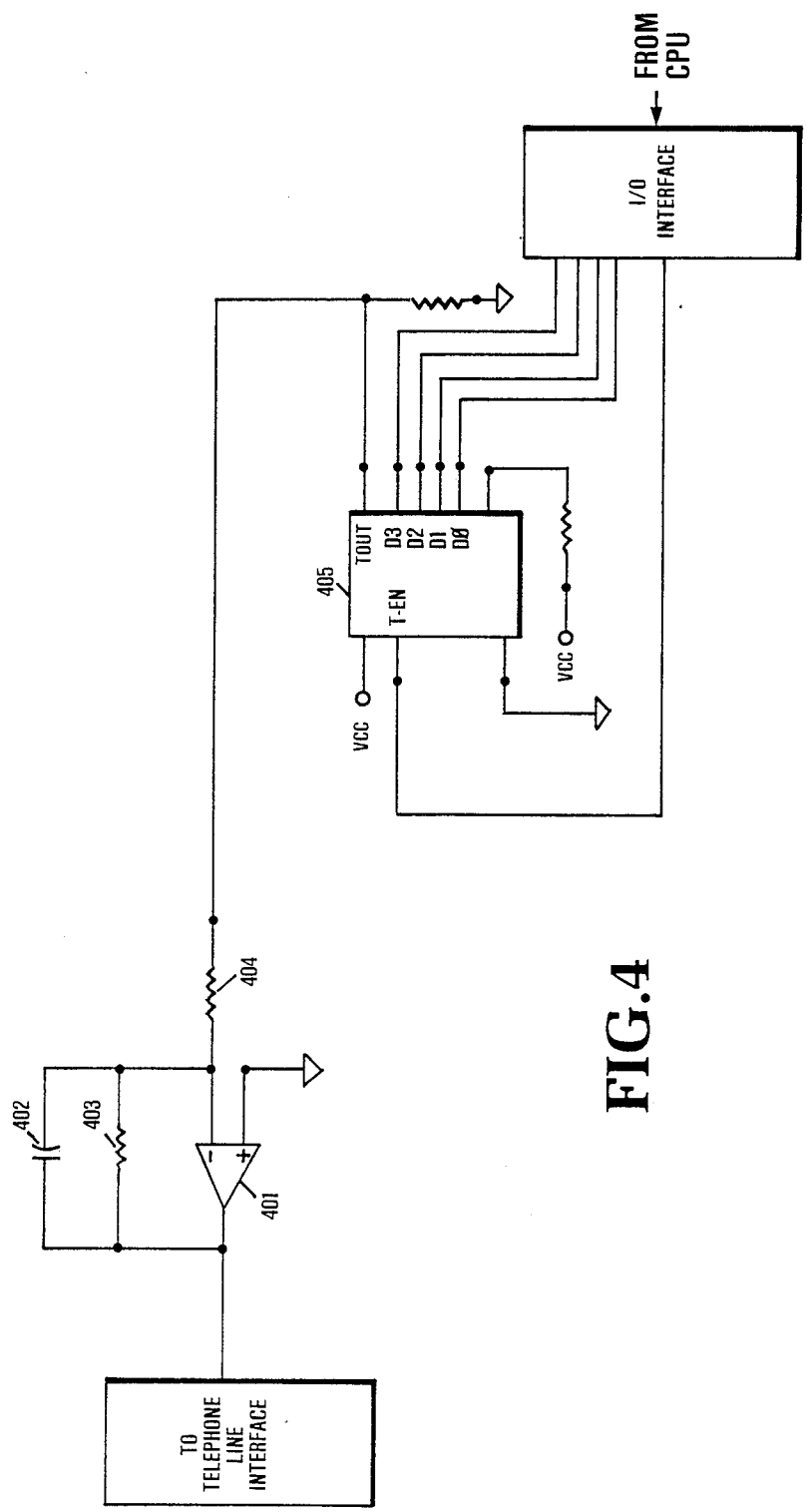
FIG. 4 is a block diagram representation of control unit 211 in FIG. 2.

FIG. 4 illustrates the tone generation circuit included as part of circuits 218 and 219, it being understood that the tone generation circuit would be identical in both of circuits 218 and 219. Device 401 is a simple amplifier circuit which amplifies the output of the tone generator circuit and applies that tone to the telephone line via the interface circuit. Components 402-404 are simple biasing components, well known in operation and will not be further described herein.

Device 405 is the actual tone generator and is manufactured by National Semiconductor. The dual tone output of this device is applied to amplifier 401 from the T-OUT output terminal. For selection of a single tone among 16 possible tones, the CPU sends a digital command signal (4- bit word) to device 405, which command signal is applied to inputs D0-D3. Not described in detail herein are control circuits 204, 205, 211 and 212. The function and construction of such control circuits is well-known in the art and examples of such control circuits can be found in standard reference texts, as well as in the disclosure of parent U.S. patent application, Ser. No. 231,494, filed Aug. 12, 1988, the disclosure of which is incorporated herein by reference.

It should, of course, be understood that while the present invention has been disclosed with respect to a particular embodiment, other variations should be apparent to those skilled in the art without departing from the spirit and scope of the invention. First, for example, while information terminal 12 is shown connected to interface 213 this connection could be routed to a position on a data or voice switch or hardwired through central office 10. Such alternative connections would allow information terminal 13 to communicate with other information terminals connected to other local loops. A plurality of information terminals could, therefore, be connected together. Second, while the ringing signal is detected within transient signal elimination circuit 11 and a signal produced which causes regeneration of a "clean" ringing signal i.e. without the transient, in transient elimination circuit 14, a clean ringing signal could be generated within transient signal elimination circuit 14 and thence coupled through transient signal elimination circuit 11 to subscriber telephone 15.

Finally, while interfaces 207 and 213 have been shown within circuits 11 and 14, these interfaces could be external to such circuits.

We claim:

1. Apparatus for use in a communications loop connecting a subscriber telephone to a telephone central office, said apparatus comprising
means for receiving different incoming signals and providing a multi-tone output signal associated with each of said incoming signals, said receiving means also eliminating an undesirable transient present in a predetermined one of said incoming signals so that none of the output signals include the undesirable transients, and
CPU driven control means responsive to a certain one of said incoming signals received by said receiving means for generating said multi-tone output signals associated with each of said input signals.

2. The apparatus of claim 1 wherein said first and second terminals are each a pair of terminals.

3. The apparatus of claim 1 wherein said incoming signals are received on said first and said second terminals.

4. The apparatus of claim 1 wherein said predetermined one of said incoming signals is a ringing signal coupled to said communications loop by said telephone central office and destined for said subscriber telephone and said receiving means eliminates an undesirable transient present in said ringing signal.

5. The apparatus of claim 1 wherein each of said predetermined one of said incoming signals is a signal indicating an off-hook condition at said subscriber telephone and destined for said telephone central office and said receiving means eliminates an undesirable transient present in the off-hook indicating signal.

6. The apparatus of claim 1 wherein said predetermined one of said incoming signals and said certain one of said incoming signals represent the same information.

7. The apparatus of claim 1 wherein said predetermined one of said incoming signals and said certain one of said incoming signals represent different information.

8. The apparatus of claim 1 wherein said certain one of said incoming signals is associated with a signal indicating an off-hook condition at said subscriber telephone.

9. The apparatus of claim 1 wherein said another one of said incoming signals is associated with a signal indicating an on-hook condition at said subscriber telephone.

10. The apparatus of claim 1 wherein said CPU driven control means further includes means responsive to a certain one of said incoming signals for closing a normally open first circuit path extending between first and second terminals of said apparatus and responsive to another one of said incoming signals for reopening said circuit path.

* * * * *